United States Patent [19]

Ohkita et al.

[11] Patent Number: 4,779,155
[45] Date of Patent: Oct. 18, 1988

[54] DISC DRIVING DEVICE EMPLOYING A SEVEN DRIVE HEAD POSITIONING UNIT

[75] Inventors: Masao Ohkita; Shinichi Omori; Atsushi Masuda, all of Furukawa, Japan

[73] Assignee: Alps Electric Co., Ltd., Japan

[21] Appl. No.: 15,922

[22] Filed: Feb. 18, 1987

[30] Foreign Application Priority Data

Jun. 4, 1986 [JP] Japan ................... 61-128222

[51] Int. Cl.$^4$ .............................. G11B 5/55
[52] U.S. Cl. ................... 360/106; 74/424.8 R
[58] Field of Search ............ 360/106, 97–99; 74/89.15, 84 R, 424.8 R, 424.8 A, 426, 459

[56] References Cited

U.S. PATENT DOCUMENTS 4,638,677  1/1987  Fuke ............... 74/424.8 R

Primary Examiner—A. J. Heinz

Attorney, Agent, or Firm—Guy W. Shoup; Paul J. Winters

[57] ABSTRACT

In a disc driving device with a carriage moving means including a screw shaft formed with a single spiral groove on an outer circumference thereof, the spiral groove being formed by a plurality of circumferential groove portions each having a greatly small lead angle and a straight bottom, the groove portions being sequentially shifted in an axial direction of the screw shaft, a stepping motor for rotatively driving the screw shaft, and a carriage having an engagement means adapted to be engaged with the spiral groove; the improvement is characterized in that each of the groove portions is divided into three parts, that is, a central small groove corresponding to a normal track position and both adjacent small grooves corresponding to a fine adjustment position, and that both the adjacent small grooves are axially shifted from the central small groove by an amount required for predetermined fine adjustment.

5 Claims, 7 Drawing Sheets

DISC DRIVING DEVICE EMPLOYING A SEVEN DRIVE HEAD POSITIONING UNIT

BACKGROUND OF THE INVENTION

The present invention relates to a disc driving device for carrying out recording and/or reproducing of information to a disc-shaped information recording medium, and more particularly to a disc driving device having a carriage moving device with an improved intermittent feeding mechanism.

In a disc driving device for carrying out recording and/or reproducing of information to an information recording medium, it is necessary to move a magnetic head for writing and/or reading a signal in a radial direction of the recording medium. A moving device for moving the magnetic head requires to be equipped with a motor as a driving source and a transmitting mechanism for transmitting a driving power of the motor to a carriage supporting the magnetic head.

A conventional disc driving device having such a moving device as above is disclosed in Japanese Patent Application No. 61-52357 filed by the same applicant as in the present application. The disc driving device disclosed in the preferred embodiment of the prior art is a so-called still video floppy device for recording/reproducing a still picture. The constitution of the still video floppy device will be described below with reference to FIGS. 5 to 8.

Figure 5:
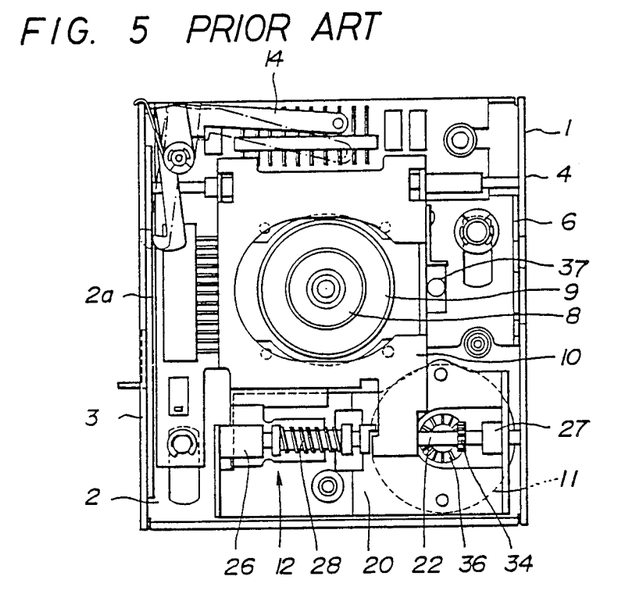
FIG. 5 is a plan view of the essential part of the disc driving device in the prior art.
Figure 6:
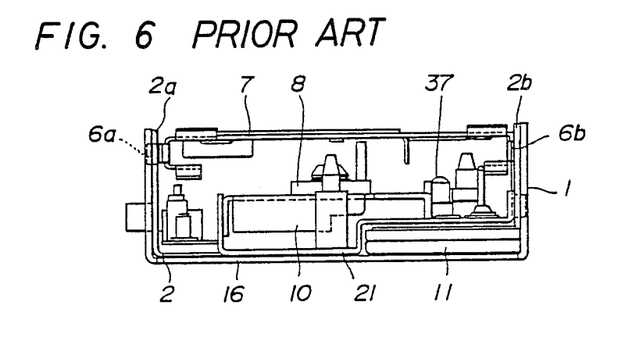
FIG. 6 is a front elevational view of the disc driving device shown in FIG. 5.

Referring to FIGS. 5 to 8, the disc driving device includes a frame 1; a slide plate 2 slidable on the upper surface of the frame 1 in the vertical direction as viewed in FIG. 5; a holder 7 for holding a disc cartridge, having side projections 6a and 6b to be engaged with cam grooves of side plates 2a and 2b of the slide plate 2 adjacent to side plates 3 and 4 of the frame 1; a motor 9 mounted on the upper surface of the frame 1 for rotating a turn table 8; the motor 9 and the turn table 8 constituting a disc driving mechanism; a carriage 10 provided on the upper surface of the frame 1 and adapted to be moved in a radial direction of a disc; a carriage moving mechanism 12 for moving the carriage 10 by a stepping motor 11; and a lock lever 14 adapted to limit a slide position of the slide plate 2.

Figure 7:
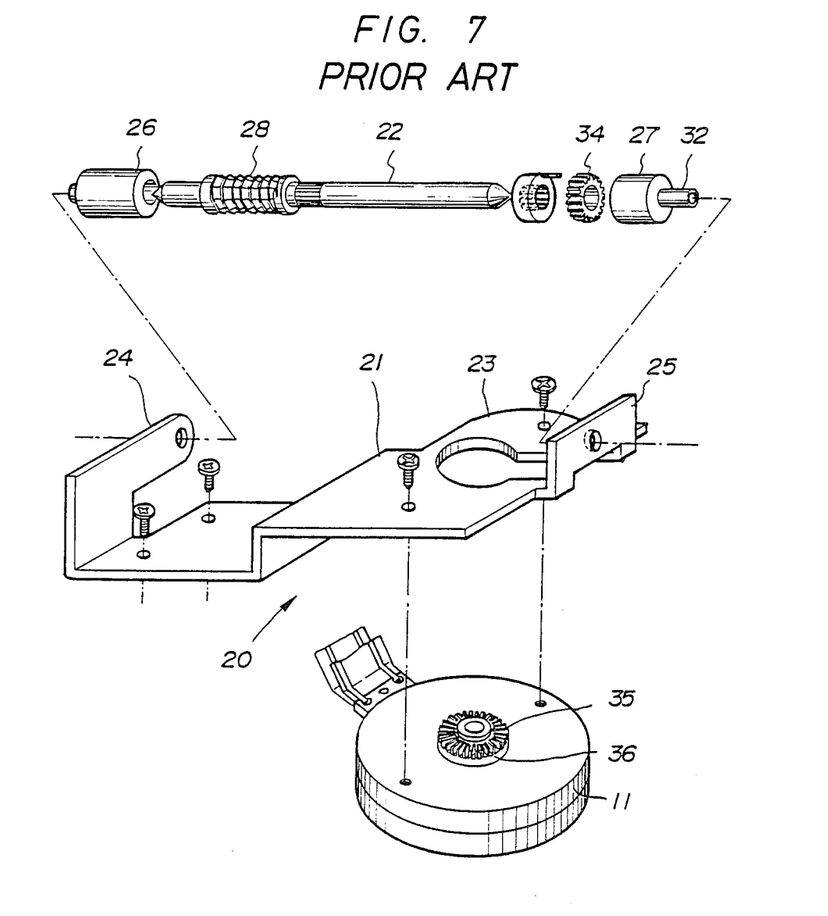
FIG. 7 is an exploded perspective view of the carriage moving unit in the prior art.
Figure 8:
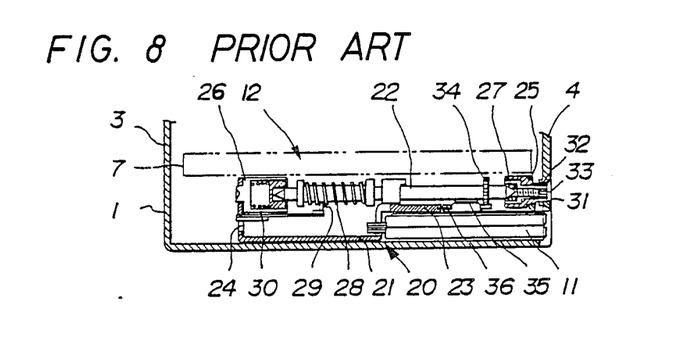
FIG. 8 is a sectional view of the essential part of the carriage moving unit shown in FIG. 7.

The carriage moving mechanism 12 used in the disc driving device is assembled to form a carriage moving unit 20. Referring to FIGS. 7 and 8, the carriage moving unit 20 is primarily constructed by a support plate 21, the stepping motor 11 and a screw shaft 22. The support plate 21 is bent to form upper and lower stages as is apparent from FIG. 7. A stepping motor mounting portion 23 is formed at the upper stage, and the stepping motor 11 is mounted on the lower surface of the stepping motor mounting portion 23. The screw shaft 22 is supported by bearings 26 and 27 supported to both side walls 24 and 25 of the carriage moving unit 20. The screw shaft 22 and the stepping motor 11 are assembled with the support plate 21 to form a unit.

Figure 9:
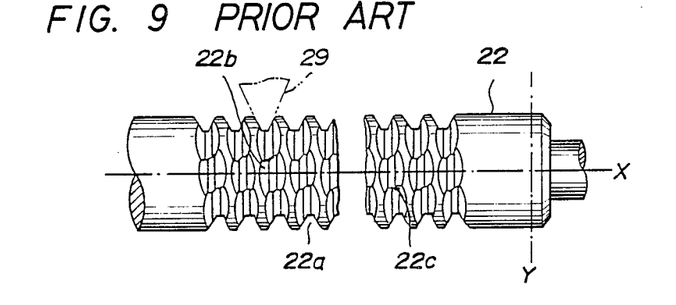
FIG. 9 is a front elevational view of the essential part of the screw shaft in the prior art.
Figure 10:
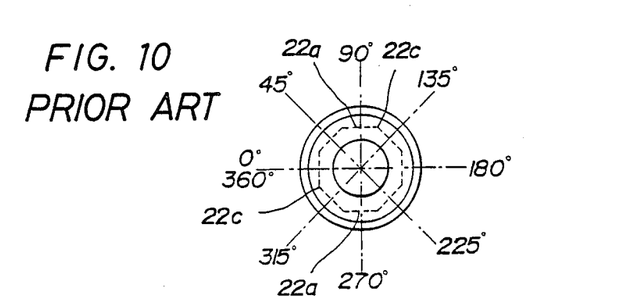
FIG. 10 is a side elevational view of the screw shaft shown in FIG. 9.
Figure 11:
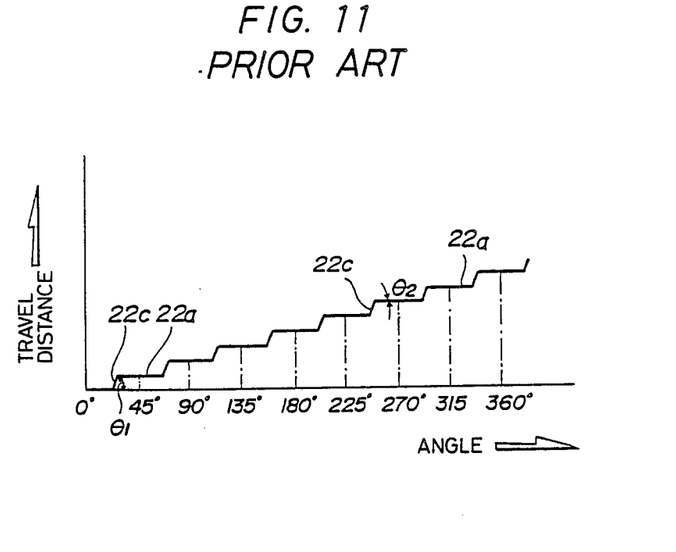
FIG. 11 is a graph showing the relation between a rotational angle and a travel distance of the spiral groove in the prior art.

An intermittent driving screw 28 formed on the screw shaft 22 is similar to that disclosed in Japanese Laid-Open Utility Model Publication No. 60-67564 filed by the same applicant as in this application. Referring to FIGS. 9 to 11, a plurality of groove portions 22a are formed on the outer circumference of the screw shaft 22 in a predetermined axial range. Each of the groove portions 22a is parallel to a perpendicular Y at right angles to an axia X, that is, has a lead angle ($=\theta_2$) of zero, and is straight at its bottom. The groove portions 22a are arranged in such a manner as to be sequentially shifted in the axial direction of the shaft 22, thereby forming a spiral groove 22b. At a connecting portion between the adjacent groove portions 22a, there is formed a feeding portion 22c for feeding the carriage 10 at a predetermined pitch.

In the carriage moving unit 20 as mentioned above wherein the engagement member 29 of the carriage 10 is engaged with the spiral groove (intermittent driving screw) 22b of the screw shaft 22, when the engagement member 29 is slided in the feeding portion 22c of the spiral groove 22b by the rotation of the screw shaft 22, the carriage 10 is moved in a predetermined direction according to a lead angle $\theta_1$. Furthermore, when the engagement member 29 comes to the target groove portion 22a of the spiral groove 22b, supply of current to the stepping motor 11 is cut to stop the movement of the carriage 10. Thus, the engagement member 29 is moved in the feeding portion 22c, and is stopped at the target groove portion 22a to thereby carry out intermittent feed of the carriage 10. Since the lead angle $\theta_2$ in the groove portions 22a is zero, a stop position of the carriage 10 may be properly set to increase the accuracy of the stop position even if a rotary angle of the screw shaft 22 is slightly slipped.

Bearings 26 and 27 for supporting both the ends of the screw shaft 22 are pivot bearings to rotatably support the conical ends of the screw shaft 22. As shown in FIG. 8, on the bearing 26 side, the screw shaft 22 is rightwardly biased by a compression spring 30, while on the bearing 27 side, an axial position of the screw shaft 22 is adjustable by means of an adjusting screw 31. The bearing 27 is supported to the side wall 25 as mentioned above, and the end 32 of the bearing 27 is projected from the side wall 25. The projected end 32 is inserted into a support hole 33 of the side plate 4 of the frame 1 to define a vertical position of the carriage moving unit 20 itself.

A spur gear 34 mounted to the screw shaft 22 is meshed with the crown gear 36 mounted to a rotating shaft 35 of the stepping motor 11 mounted to the support plate 21 to transmit a step operation of the stepping motor 11 through the crown gear 36 and the spur gear 35 to the screw shaft 22. Thus, the rotational operation of the stepping motor 11 is transmitted through the intermittent driving screw 28 to the carriage 10 to advance the same every step.

In the disc driving device as mentioned above, a track space of a magnetic disc (not shown), e.g., a still video floppy disc is 100 $\mu$m, and a maximum amount of off-tracking of the disc driving device is specified to $\pm 15$ $\mu$m. This value is specified in consideration of compatibility of the disc in a reproducing apparatus. The amount of off-tracking in this range would not hinder usual reproduction in outline. However, a picture quality is remarkably improved by finely adjusting a head position in the reproducing apparatus according to the amount of off-tracking.

In the above disc driving device, fine adjustment of the position of the magnetic head 37 is effected by the adjusting screw 31. When the head position is finely adjusted to an optimum position upon reproducing, and recording is carried out under the condition, the recording process is effected under the reproducing off-tracking condition. When the recorded picture is reproduced by another reproducing apparatus, a head position of the reproducing apparatus is required to be finely adjusted again to the specified amount of off-tracking. Then, in the case of recording a picture by the disc driving device used for reproduction, and reproducing the picture recorded by a still another reproducing apparatus, the fine adjustment is required similarly. In this manner, the fine adjustment is accumulated to cause an accumulated amount of off-tracking. As a result, the amount of off-tracking cannot be covered by the prescribed range of ±15 μm to cause a possibility of hindrance of compatibility of the disc.

To cope with this problem, it is necessary to always maintain a normal track position upon recording and conduct the fine adjustment upon reproducing only, and especially upon reproducing a picture recorded by another disc driving device. In other words, it is necessary to provide a servo mechanism for always returning the magnetic head to a predetermined recording position upon recording irrespective of the fine adjustment upon reproducing and for maintaining an optimum position upon reproducing.

The servo mechanism is operated to move the screw shaft 22 itself in its thrust direction. However, the provision of the servo mechanism makes the disc driving device complicated to cause an enlarged size of the device and an increased cost.

SUMMARY OF THE INVENTION

It is an object of the present invention to provide a disc driving device having a carriage moving means which is simple in structure and may sufficiently follow the afore-mentioned off-tracking.

It is another object of the present invention to provide a disc driving device having a carriage moving means which is of low cost and may hold compatibility of discs.

According to the present invention, in a disc driving device with a carriage moving means including a screw shaft formed with a single spiral groove on an outer circumference thereof, the spiral groove being formed by a plurality of circumferential groove portions each having a greatly small lead angle and a straight bottom, the groove portions being sequentially shifted in an axial direction of the screw shaft, a stepping motor for rotatively driving the screw shaft, and a carriage having an engagement means adapted to be engaged with the spiral groove; the improvement is characterized in that each of the groove portions is divided into three parts, that is, a central small groove corresponding to a normal track position and both adjacent small grooves corresponding to a fine adjustment position, and that both the adjacent small grooves are axially shifted from the central small groove by an amount required for predetermined fine adjustment.

With this arrangement, the off-tracking may be minimized by controlling a rotational angle of the stepping motor under the condition where the shifting amount of both the adjacent small groove portions is set to the amount of predetermined maximum off-tracking, for example, and one step of the stepping motor corresponds to each of the small groove portions. In other words, the magnetic head is designed to move from the central small groove portion to the adjacent small groove by one-step feeding of the stepping motor, whereby the predetermined amount of off-tracking may be covered by moving the magnetic head from the central small groove portion corresponding to the amount of off-tracking of zero in the disc driving device by one step forwardly or reversely. Further, an optimum head position may be selected by selecting a position for detection of a maximum signal level from the head device from the three small groove portions.

Other objects and features of the invention will be more fully understood from the following detailed description and appended claims when taken with the accompanying drawings.

DETAILED DESCRIPTION OF THE PREFERRED EMBODIMENT

FIGS. 1 to 4 show a spiral groove of the screw shaft used in the disc driving device in a preferred embodiment of the present invention, in which the same or corresponding parts as in the prior art are designated by the same reference numerals, and the description thereof will be appropriately omitted.

Figure 1:
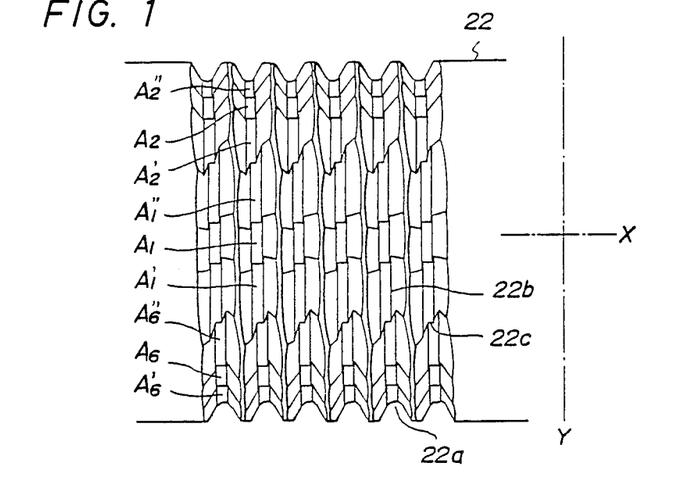
FIG. 1 is a front elevational view of the essential part of the screw shaft of a preferred embodiment according to the present invention.
Figure 2:
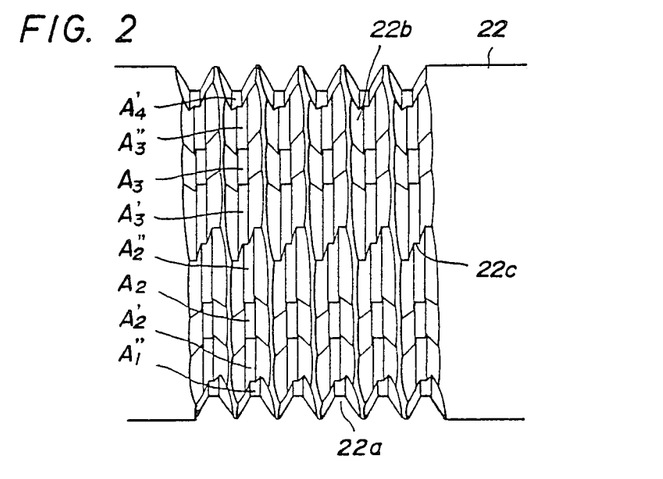
FIG. 2 is a plan view of the screw shaft shown in FIG. 1.

Referring to FIGS. 1 and 2, a plurality of groove portions 22a are formed on the outer circumference of a screw shaft 22 in a predetermined axial range. Each of the groove portions 22a is parallel to a perpendicular Y at right angles to an axis X, that is, has a lead angle of zero, and is straight at its bottom. The groove portions 22a are arranged in such a manner as to be sequentially shifted in the axial direction of the shaft 22. Thus, the groove portions 22a form a spiral groove 22b in the same fashion as in the prior art.

Figure 3:
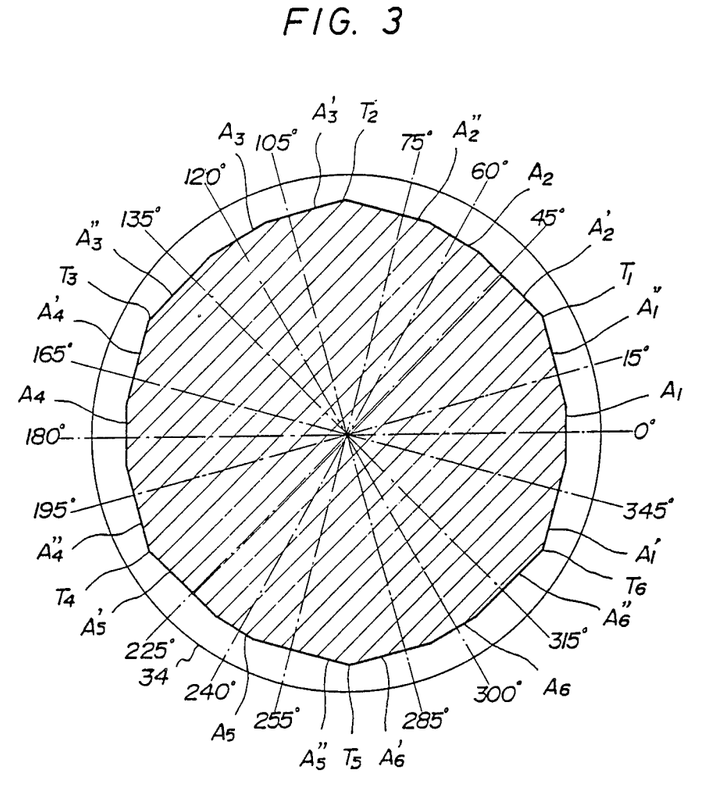
FIG. 3 is a sectional view taken along the bottom of the spiral groove.
Figure 4:
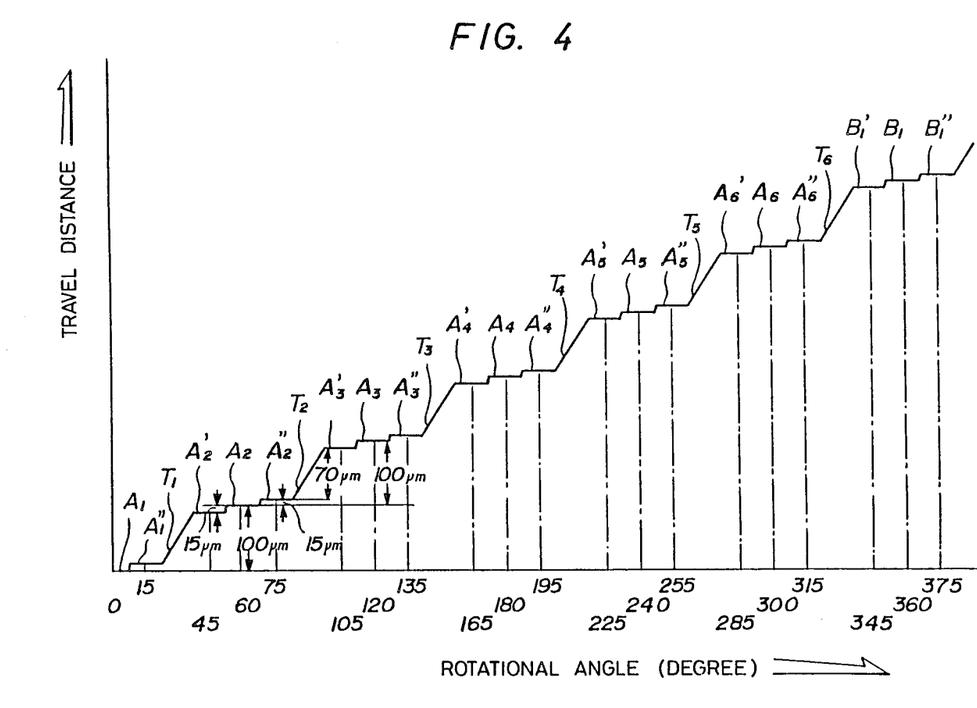
FIG. 4 is a graph showing the relation between a rotational angle and a travel distance of the spiral groove.

A circumferential one pitch of the spiral groove 22b is formed by small groove portions $A_1$, $A_2$, $A_3$, $A_4$, $A_5$ and $A_6$ corresponding to a normal track position and small groove portions $A_1'$, $A_1''$, $A_2'$, $A_2''$, $A_3'$, $A_3''$, $A_4$40, $A_4''$, $A_5'$, $A_5''$, $A_6'$, and $A_6''$ corresponding to a fine adjustment position. As will be apparent from FIGS. 3 and 4, the small groove portions $A_1$ to $A_6$ corresponding to the normal track position are axially shifted by 100 μm from one another at angular intervals of 60° in the circumferential direction in accordance with a track pitch of a still video floppy disc. The small groove portions $A_1'$ to $A_6''$ corresponding to the fine adjustment position are formed at both circumferential ends of the small grooves $A_1$ to $A_6$ in such a manner as to be axially shifted to the respective adjacent small groove portions $A_1$ to $A_6$ by $-15$ μm and $+15$ μm corresponding to a permissible maximum off-tracking amount of the still video floppy disc. As a whole, one circle of the spiral groove 22b b is sequentially divided into eighteen small grooves. As shown in FIG. 3, the small groove portions $A_1'$ to $A_6''$ corresponding to the fine adjustment position are formed at angles of $-15°$ and $+15°$ relative to the adjacent small grooves $A_1$ to $A_6$ corresponding to the normal track position. The rotational angle of 15° is set to correspond to one step of the stepping motor 11, and feeding of one track is corresponding to four steps of the stepping motor 11 as shown in FIG. 4. The other parts of the disc driving device except the spiral groove 22b of the screw shaft 22 are identical with those in the prior art as previously mentioned.

Now, there will be described the operation of the disc driving device for a still video floppy disc camera employing the carriage moving device having the screw shaft 22.

In recording, an engagement member 29 is always positioned in the small groove portions $A_1$, $A_2$, $A_3$, $A_4$, $A_5$, $A_6$ ... corresponding to the normal track position, and information is recorded at this position.

In reproducing, a reproduction output is detected among the three small groove portions, e.g., the small groove portion $A_1$ corresponding to the normal track position and the small groove portions $A_1'$ and $A_1''$ adjacent to the small groove portion $A_1$. Among then, the small groove portion providing a maximum reproduction output is selected. Provided that the selected small groove portion is the small groove portion $A_1''$ shifted by $+15$ μm from the normal track position, maximum reproduction outputs for all the tracks may be obtained by selecting the small groove portions $A_2''$, $A_3''$, $A_4''$, $A_5''$, $A_6''$... shifted by $+15$ μm at an angle of 15° relative to the normal track position, since each track is formed at regular intervals of 100 μm. Each track is corresponding to four steps of the stepping motor 11. Thus, the reproduction output is detected, and a still position of the stepping motor 11 is once set by a servo circuit to thereby obtain a best reproduction picture at all times. In replacement of the still video floppy disc for reproduction, the afore-mentioned selecting operation is only once carried out, and the stepping motor is set to be always returned to the small groove portions $A_1$, $A_2$, $A_3$ ... defining the normal track position in recording. Thus, confusion of the track positions in recording and reproducing may be prevented.

A moving operation from a certain track to the next track with four steps may be effected as follows. The axial shift amount between the adjacent small groove portions corresponding to the fine adjustment position, e.g., the small groove portions $A_2''$ and $A_3'$, is set to 70 μm, and the engagement member is designed to move with one step on the juncture therebetween, that is, portions $T_1$ to $T_6$ corresponding to the feeding portions 22c as shown in FIGS. 3 and 4. Thus, the adjustment of the track position by 15 μm with one step and the feeding of one track with four steps may be accurately conducted. Accordingly, simple fine adjustment and accurate feeding may be attained at the same time.

Although the preferred embodiment is referred to the still video floppy disc driving device for picture recording and reproducing, the present invention is naturally adaptable to a general disc driving device wherein off-tracking greatly influences upon signal recording and reproducing, and is more especially effective to a disc driving device for a high-density recording.

There will be now described the effects of the preferred embodiment.

(1) In shooting with a camera using the still video floppy disc driving device, a picture may be recorded in a normal track position under a non-servo condition by engaging the engagement member 29 with the small groove portions $A_1$, $A_2$, $A_3$ ... corresponding to the normal track position, thereby rendering the stepping motor 11 still.

(2) In using the still video floppy disk driving device as a reproducing apparatus, a picture with superior quality may be reproduced as compared with a conventional reproducing apparatus having no fine adjustment function since fine adjustment of $\pm15$ μm may be simply effected.

(3) Since the above-mentioned fine adjustment is simply effected by detecting a reproduction output and moving a still position of the stepping motor 11 by $\pm1$ step by a servo circuit, any mechanical parts for the fine adjustment are not necessary to provide, and therefore, the disc driving device may be made compact with light weight and low cost.

(4) As the screw shaft 22 is moved by one step of the stepping motor 11 across the normal track position, the magnetic head 37 may be quickly positioned.

(5) In the case of using the disc driving device for a camera, high-speed shooting may be improved since seeking is effected by four steps in the normal track position.

(6) As the small groove portions $A_1'$, $A_1''$, $A_2'$, $A_2''$, $A_3'$, $A_3''$... corresponding to the fine adjustment position are formed adjacent to the small groove portions $A_1$, $A_2$, $A_3$ ... corresponding to the normal track position in such a manner as to be axially shifted by $\pm15$ μm at the circumferential angle of 15°, an amount of movement of the engagement member 29 in each of the small groove portions is reduced to thereby render the movement thereof smooth.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a disk driving device for moving a carriage supporting a magnetic head relative to a disk recording medium having a plurality of successive recording tracks thereon, said device comprising carriage moving means including a screw shaft extending in an axial direction and formed with a single spiral groove on an outer circumference thereof, said spiral groove being formed with a plurality of circumferential groove portions each having a very small lead angle and a straight bottom wall extending in a transverse direction substantially perpendicular to said axial direction, said groove portions being sequentially shifted from each other in successive axial increments in said axial direction of said screw shaft corresponding to positioning said carriage at track positions on the disk and in successive circumferential angle increments corresponding to incremental angular rotation of said screw shaft, a stepping motor for rotatively driving said screw shaft in angular step increments, and a carriage having an engagement means engagement in said groove portions of said spiral groove for moving said carriage to the track positions on the disk upon rotation of said screw shaft by said stepping motor, the improvement wherein each of said groove portions is divided into three parts, that is, a central small groove portion corresponding to a normal track position on the disk, and two adjacent small groove portions, one on a leading side and the other on a trailing side of said central small groove portion along said spiral groove corresponding to leading and trailing fine adjustment positions from the normal track position of said central small groove, wherein said two adjacent small groove portions are axially shifted on the respective leading and trailing sides from said central small groove by an axial amount which is a small fraction of said axial increment between successive groove portions in said axial direction of said screw shaft.

2. The disc driving device as defined in claim 1, wherein said both adjacent small grooves are axially shifted from said central small groove by an amount corresponding to a permissible maximum off-tracking of a still video floppy disc.

3. The disc driving device as defined in claim 2, wherein said amount corresponding to the permissible maximum off-tracking is 15 $\mu$m.

4. The disc driving device as defined in claim 1, wherein said both adjacent small grooves are formed at a circumferential angle corresponding to one step of said stepping motor relative to said central small groove.

5. The disc driving device as defined in claim 4, wherein said circumferential angle corresponding to one step of said stepping motor relative to said central small groove is 15°.

* * * * *

UNITED STATES PATENT AND TRADEMARK OFFICE
CERTIFICATE OF CORRECTION

PATENT NO.   : 4,779,155
DATED        : October 18, 1988
INVENTOR(S)  : Masao Ohkita et al.

It is certified that error appears in the above-identified patent and that said Letters Patent is hereby corrected as shown below:

Col. 6, line 68, "engagement" should read --engaged--.

Signed and Sealed this

Eighteenth Day of April, 1989

Attest:

DONALD J. QUIGG

*Attesting Officer*     *Commissioner of Patents and Trademarks*